Figure 1:
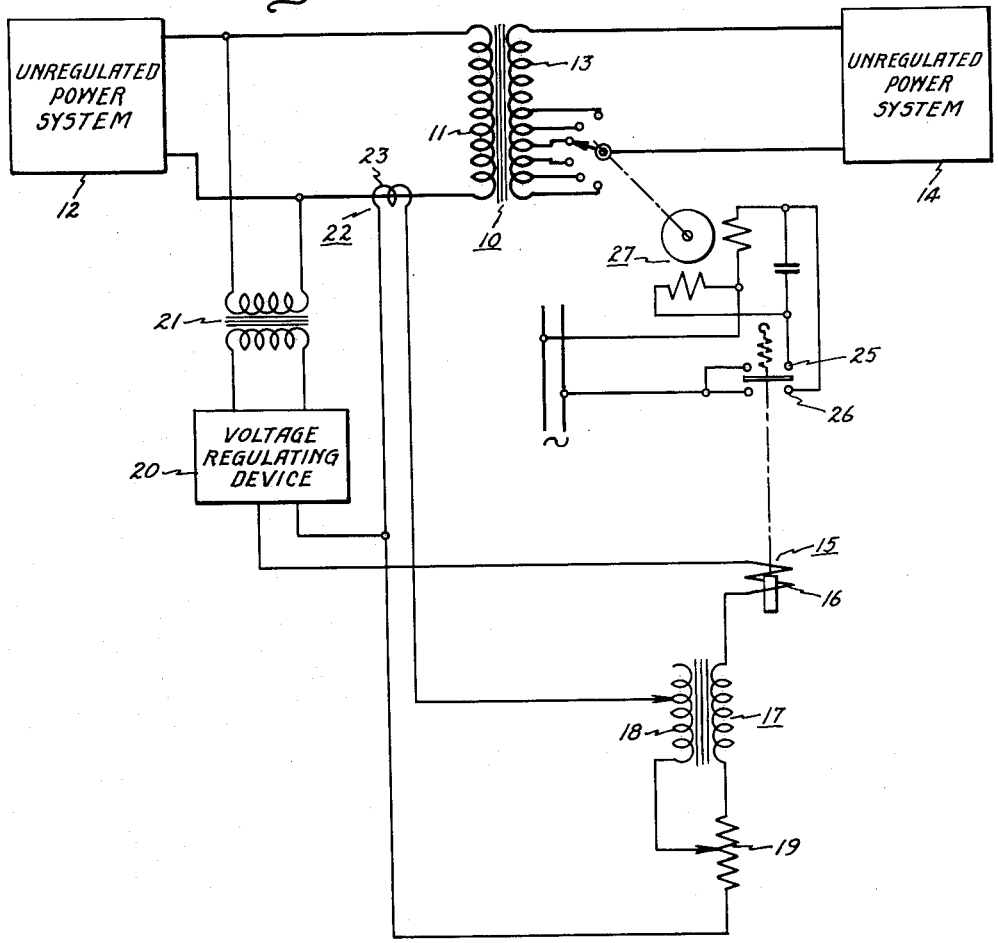

Inventors
Harold E. Pinney,
Robert H. Brennan,
by Gilbert P. Tarleton
Their Attorney.

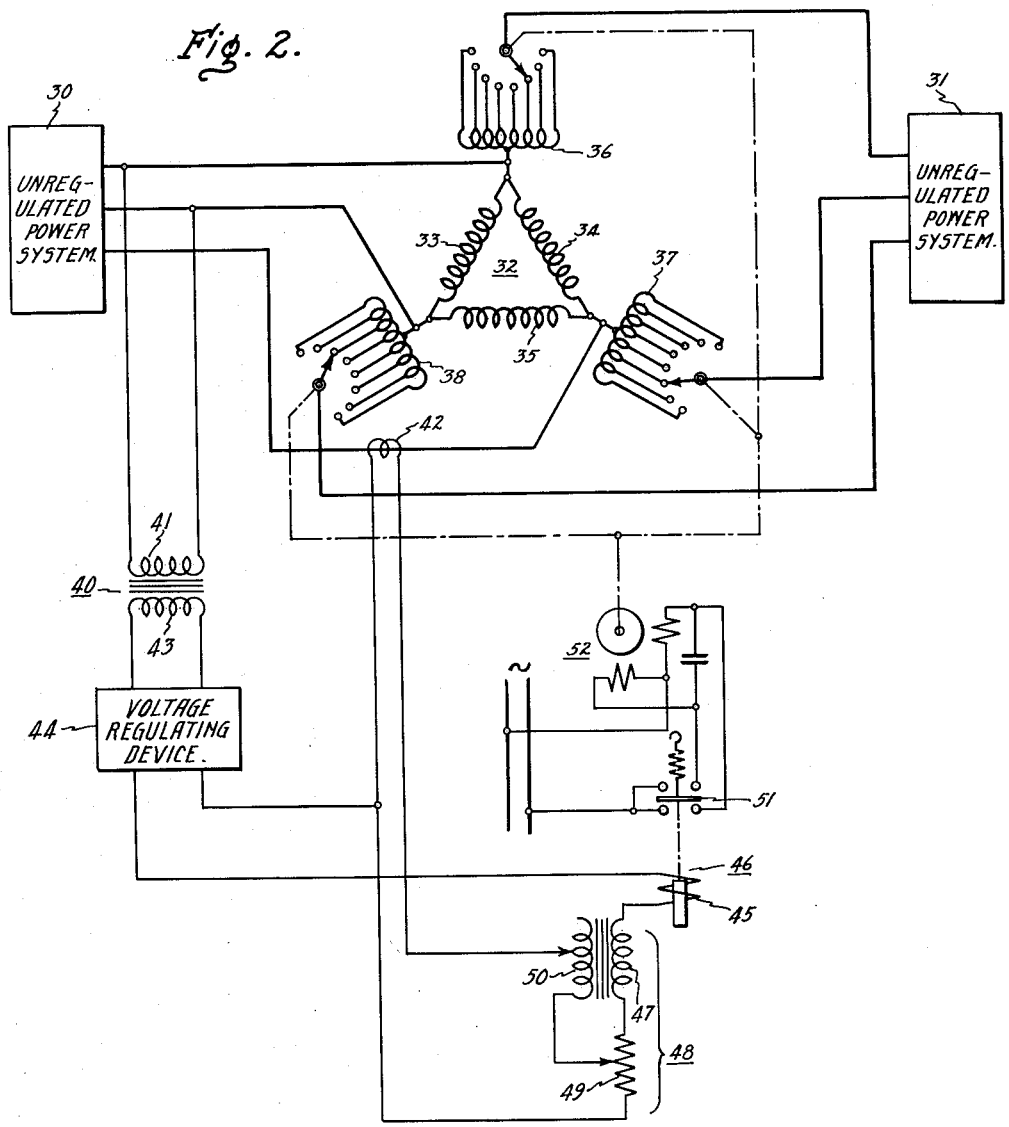

United States Patent Office 2,994,786
Patented Aug. 1, 1961

2,994,786
POWER FLOW CONTROL SYSTEM
Harold E. Pinney and Robert H. Brennan, Pittsfield, Mass., assignors to General Electric Company, a corporation of New York
Filed Jan. 30, 1956, Ser. No. 562,199
8 Claims. (Cl. 307—51)

This invention relates to means for interconnecting electric power systems, and more in particular to means for controlling the inphase and reactive power flow between electric power systems or electric generating sources when the voltage of neither of the power systems is stable.

Voltage regulators, such as automatically controlled load tap changing transformers or induction voltage regulators, are sometimes used as variable ratio links in electric power transmission systems between several sources of electrical power, in order to control the flow of zero power factor current, or reactive power flow (hereinafter also referred to as kilovar flow) between the power systems. Voltage regulators are normally provided with a standard voltage sensitive automatic control device, such as a voltage regulating relay, and also line drop compensating means. In a typical alternating current regulating system, the coil of the regulating relay is connected in series with the secondary winding of a potential transformer and the line drop compensator means, which may be comprised of a variable reactor and a variable resistor in series. The primary winding of the potential transformer is connected across the load terminals of the regulating transformer, and a voltage is induced in the line drop compensator, by means of a current transformer, that is proportional to the load current of the transformer, the current transformer being coupled to an output lead of the regulator. Thus the coil of the voltage regulating relay "sees" a voltage that is the vector sum of the regulator output voltage and the voltage introduced by a current proportional to the output current of the regulator flowing through the reactor and resistor of the line drop compensator. Normally (i.e., when the regulator is employed to regulate the voltage of a single power system), the line drop compensator is connected so that reactive current flowing from the source to the load will cause a voltage in the reactor that subtracts from the voltage of the secondary winding of the potential transformer, so that the voltage across the coil of the voltage regulating relay is decreased. This results in the motor drive of the regulator being actuated to increase the load voltage of the regulator. Unity power factor current flowing through the regulator has a similar effect upon the motor drive of the regulator. The voltage regulating relay acts on the regulator by means of the motor drive to hold the "load center voltage" at a constant value.

In a typical application of a voltage regulator for controlling kilovar flow between a pair of interconnected systems, the load terminals of a voltage regulator are connected to a system having a regulated voltage, and the source terminals of the regulator are connected to an unregulated system. The voltage regulating relay is set to hold the same voltage as the regulated system. The connections to the reactance element of the line drop compensator are reversed from those employed when the regulator is connected to regulate the voltage of a single power system.

In the above-described arrangement, unity power factor current flowing through the regulator from the unregulated system results in the tap changing mechanism being actuated to increase the turns of the transformer connected between the load terminals (i.e. increase the turns ratio of the transformer), the increase being proportional to the setting of the resistor of the line drop compensator. Since the reactor of the line drop compensator has been reversed, however, zero power factor current flowing through the regulator from the unregulated system to the regulated system provides a voltage across the reactor that results in decrease in the turns of the transformer that are connected to the load terminal, the decrease being proportional to the setting of the reactor. This reduces the kilovar flow since it lowers the portion of the unregulated system voltage appearing at the load terminals of the regulator. Unity power factor current and zero power factor current flowing in the other direction through the regulator (i.e. from the regulated system to the unregulated system), have the opposite effect on tap changes of the transformer from that previously described. The setting of the reactor of the line drop compensator has negligible effect upon the response of the tap changing mechanism to unity power factor current and the setting of the resistor of the line drop compensator has negligible effect on the tap changing mechanism in response to zero power factor current, since these currents provide voltage drops across the reactor and resistor respectively that are in quadrature with the voltage across the coil of the voltage regulating relay. If the resistance element of a line drop compensator is set to have zero resistance, the regulator will be automatically adjusted to reduce the kilovar flow to substantial zero value. If the regulated system does not have sufficient thermal capacity to carry the peak kilovar load, a compromise arrangement may be obtained whereby some kilovars will be drawn from the unregulated system. This may be done by means of the resistance element of the line drop compensator. Thus, when load current flows toward the regulated system, the resistance element of the compensator causes the regulator to operate to increase the load windings of the regulator. This results in a flow of reactive current toward the regulated system. The reversed reactance element responds to the reactive current to cause the regulator to decrease the regulator load turns. When these two opposite compensations become equal, operation will be stabilized. The resultant power factor may be predetermined by the ratio of the settings of the compensator element. The resistance element may also provide compensation for voltage drop in feeder lines between the regulated and unregulated system.

The key to the above-described method of controlling the kilovar flow between electrical power systems lies in the fact that a constant voltage is held by one of the systems and this constant voltage is balanced against the same voltage held by the regulator. Kilovar flow through the regulator acts through the reversed reactance compensator element to disturb this balance in the direction to reduce the quadrature current to zero value. The above-described system will not function correctly if both of the power systems have unstable voltages.

When the voltage of both of the systems are unstable, it has been common in the past to employ VAR. sensitive relays, such as induction disc type relays wherein the torque on the disc is proportional to zero power factor current. Such relays are normally connected so that their contacts actuate the motor drive of the load tap changing transformer to reduce kilovar flow. This arrangement, however, requires the use of non-standard components, and the control available is not flexible. For example, it cannot be employed to obtain a kilovar flow proportional to the power flow. Another disadvantages of this arrangement is that, since such relays are not reversible, two relay must be employed for each interconnected power system control.

It is therefore an object of this invention to provide an improved and flexible means for controlling reactive and inphase power flow between interconnected electrical power systems none of which have stable or regulated voltages.

Another object is to provide means including voltage regulating means such as load tap changing transformer, for controlling reactive power flow between interconnected electrical power systems, neither of the systems having a stable or regulated voltage.

A still further object of this invention is to provide means, including a phase angle control transformer for controlling the inphase power flow between inter-connected electrical power systems, especially where neither of the systems have a stable or regulated voltage.

Briefly stated, our invention provides a means for control of reactive or inphase power between a pair of unregulated power systems. The control function is accomplished by providing a constant voltage source, and a source of voltage proportional to the current flowing between the two power systems. The sum of the voltage of the constant voltage source and one component of voltage proportional to the current flowing between the systems is applied to a voltage sensitive device such as a voltage regulating relay. This component of voltage may be either inphase with or in quadrature with the current flowing between the systems. The voltage sensitive device is connected to selectively actuate means for controlling the flow of current between the two power systems. Proportional control of inphase to reactive power and reactive to inphase power may also be obtained by applying the other components of the voltage proportional to the flow of current in series with the voltage sensitive device and opposing the constant voltage.

In accordance with one embodiment of this invention, we provide a load tap changing transformer to control the reactive power flow between a pair of interconnected electrical power systems, the load terminals of the load tap changing transformer being connected to one power system and the source terminals being connected to the other power system. A voltage regulating relay is provided having its coil connected in series with a reactor and a variable resistor, the reactor and resistor comprising a line drop compensator. A constant voltage source is also connected in series with the relay coil. The constant voltage source may be any conventional source of constant alternating voltage, such as a constant voltage transformer or an induction regulator. The constant voltage source may be energized from one of the unregulated electrical power systems. A current transformer is provided having a current flow in its secondary winding that is proportional to the current flowing between the two electrical power systems. This current transformer is connected to the line drop compensator in the conventional manner with the exception that the reactance element terminal connections are reversed from that which they would be if the load tap changing transformer were used to regulate the voltage of a single power system. The contacts of the voltage regulating relay are connected to a motor drive circuit for operating a tap changing mechanism.

As a modification of the above-disclosed arrangement, the inphase power exchange between two electrical power systems may also be controlled on electrical power systems by employing a phase angle control transformer. In this modification, the potential and curernt transformers are preferably connected to the system so that the outputs are 90° out of phase with each other on the basis of unity power factor current. With this arrangement, the reactance element may be employed to control the inphase power flow, and if the resistance element of the line drop compensator is reversed, it may be employed to control the proportionality between the inphase and reactive power flow.

Our invention will be better understood from the following description taken in connection with the accompanying drawing and its scope will be pointed out in the appended claims.

In the drawings,

FIG. 1 is a circuit diagram of one embodiment of the control system of this invention adapted for controlling the flow of reactive power between a pair of unregulated electrical power systems, and FIG. 2 is a circuit diagram of another embodiment of the control system of this invention adapted for controlling the flow of inphase power between a pair of unregulated polyphase electrical power systems.

Referring now to FIG. 1 therein is illustrated a load tap changing transformer 10 having an untapped winding 11 connected to one unregulated power system 12 and a tapped winding 13 connected to a second unregulated electrical power system 14. The power systems 12 and 14 are independent systems, each having its own power source and load circuits. A voltage regulating relay 15 is provided having its coil 16 connected in series with a line drop compensator 17 comprised of a reactor 18 and a variable resistor 19. The output of a conventional voltage regulating device 20, such as a constant voltage transformer or an induction voltage regulator is connected in series with the coil 16 and the line drop compensator elements 18 and 19. The input to the voltage regulating device 20 is connected to the secondary winding of a potential transformer 21 and the primary winding of the transformer 21 is connected in parallel with the unregulated power system 12. A current transformer 22 having a secondary winding 23 is inductively coupled to one of the leads connecting the load tap changing transformer to the unregulated electrical power system 12. If desired, however, the current transformer 22 may be coupled to one of the lines connecting the load tap changing transformer 10 to the other unregulated power system 14. The secondary winding 23 of the current transformer 22 is connected to the line drop compensator in the conventional manner, with the exception that the reactance element 18 is reversed from the connections it would have were the load tap changing transformer to be employed for the regulation of a single electrical power system. The voltage regulating relay 15 has "raise" contacts 25 and "lower" contacts 26 connected to a motor drive 27 in the conventional manner for operating the tap changing mechanism of the load tap changing transformer 10.

If it is desired to hold the kilovar interchange between the power systems 12 and 14 to a minimum, the voltage regulating relay of the regulator is set to the same voltage level as maintained by the voltage regulating device 20, and the resistor 19 is set so that none of the current of transformer 22 passes through it. In the event of kilovar flow between the two systems 12 and 14, reactive current flows in the line drop compensator reactor element 18 and provides a voltage which adds vectorially with the voltage output of the voltage regulating device 20. If the resultant current flowing through the coil 16 of the voltage regulating relay is sufficiently great, a pair of contacts 25 or 26 of the voltage regulating relay will be bridged, and the motor drive 27 thus energized to make tap changes on the load tap changing transformer 10. Since the reactor 18 is connected in reverse from the connection employed in a system for regulating the voltage of a single power system, the voltage regulating relay actuates the motor drive 27 to make tap changes to reduce the reactive current flow. Thus if zero power factor current is flowing from power system 14 to power system 12, as a result of an increase in the voltage of system 14 or a decrease in the voltage of system 12, the motor drive 27 will be energized to increase the turns in the winding 13 of the tap changing transformer connected to the power system 14.

In some applications it is desirable to provide a flow of kilovars between the systems that is proportional to the power flow, for example, if one of the systems does not have sufficient thermal capacity to carry a peak kilovar load. This may be accomplished by setting the reactor and resistor of the line drop compensator such that the ratio of the reactance to the resistance is equal to the desired ratio of real kva. to reactive kva. If it is desired to provide for a constant value of kvar. flow, the resistor 19 may be set to zero (no resistance in the current transformer 22 circuit), and the voltage level of the regulating relay set at a different value than that maintained by the voltage regulating device 20. With this latter connection, the kilovar flow may be maintained within a desired range as determined by the band width setting of the voltage regulating relay and the setting of the reactor 18. The band width, however, must be sufficiently wide so that kilovar flow change in the system caused by one tap change does not result in a change in the bias of the regulating relay greater than the band width, in order to prevent hunting.

For three phase systems, the voltage output of the voltage regulating device 20 must be inphase with the line to neutral voltage of the phase of the power system to which the current transformer 22 is coupled, if a current transformer is used on only one line. If the current transformers are cross connected in a three phase system (i.e. two current transformers having their secondary windings in parallel and their primary windings coupled to separate phases), the output voltage of the voltage regulating device must be inphase with the line to line voltage of the two phases.

As another modification, the same basic control system as previously disclosed may be employed with a phase angle control load tap changing transformer to control the interchange of inphase power. In one connection of this type, the current transformer and potential transformer are connected so that their output voltages are 90° out of phase and the connections from the current transformer to the reactance element of the line drop compensator are such that the control system is actuated to decrease the flow of inphase, or load current. With this connection the reactance element is used to control the inphase power interchange. In this case, the resistance element would be employed to control the inphase power flow proportional to the reactive power flow, the setting of the resistor determining the proportionality between the inphase and reactive power flow.

An example of this modification, which is more readily adapted to a three phase system than a single phase system, is illustrated in FIG. 2 of the drawings, wherein is shown a pair of unregulated three phase power systems 30 and 31 connected to a phase angle control load tap changing transformer 32. The transformer 32 has delta connected windings 33, 34 and 35 connected to power system 30, and also tap changing windings 36, 37 and 38 having center taps connected respectively to the junctions between windings 33 and 34, windings 34 and 35, and windings 35 and 33. Windings 36, 37 and 38 are also inductively coupled respectively to windings 35, 33 and 34. The tap changing arms of the windings 33, 34 and 35 are connected to the power system 31.

A potential transformer 40 has a primary winding 41 connected between two of the connections between the power system 30 and the transformer 32, and the secondary winding of a current transformer 42 is coupled to the other connection between the power system 30 and the transformer 32.

The secondary winding 43 of the potential transformer is connected to the input terminals of a voltage regulating device 44, such as an induction voltage regulator, and the regulated output of the regulating device 44 is connected in series with the coil 45 of voltage regulating relay 46, winding 47 of the reactance element line drop compensator 48, and resistor 49 of the line drop compensator 48. The current transformer 42 has its secondary winding connected in series with winding 50 of the reactance element of line drop compensator 48, and also resistance element of the line drop compensator. The portions of winding 50 and resistor 49 in series with the current transformer secondary winding may be varied.

The contacts 51 of voltage regulating relay 46 are connected in the manner previously described in reference to the circuit of FIG. 1 to selectively actuate the motor drive 52, which is mechanically coupled by conventional means to simultaneously change taps on the tap changing windings 36, 37 and 38.

In this arrangement, since the voltages at the output terminals of the regulating device and current transformer are 90° out of phase on the basis of unity power factor load, inphase component of current transformer voltage in series with the coil of the voltage regulating relay is controlled by the reactance element of the line drop compensator, and the reactive component of the current transformer voltage in series with the coil of the voltage regulating relay is controlled by the resistor of the line drop compensator. For proper operation, the reactance element is connected such that the increases in inphase component of current transformer secondary winding voltage results in the voltage regulating relay actuating the tap changing mechanism in the proper direction to decrease the flow of inphase power. If control of inphase power proportional to reactive power is not desired, the resistor 49 may be omitted, but if a proportionality is desired between the reactive and inphase power flow, the resistor is connected such that the reactive component of the current transformer secondary winding voltage in series with the coil of the voltage regulating relay opposes the inphase component of the current transformer secondary winding voltage.

As a modification of the above-disclosed system, the current and potential transformers may be connected to that their secondary winding voltages are inphase for unity power factor load. In this case the resistance element would be employed to control the inphase power, and is connected so that the voltage regulating relay is actuated to decrease the flow of unity power factor current, while the reactance element is connected such that the reactive component of the current transformer secondary winding voltage in series with the coil of the voltage regulating relay opposes the inphase component of the current transformer secondary winding voltage.

It is obvious that the voltage regulating transformer may be a load tap changing transformer, an induction or step voltage regulator, a regulating autotransformer as well as a phase angle control transformer, or any similar voltage regulating means.

It will be understood, of course, that, while the form of the invention herein shown and described constitutes a preferred embodiment of the invention, it is not intended herein to illustrate all of the possible equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. A system for controlling the flow of one component (i.e. reactive or inphase) of power between a pair of interconnected electrical power systems neither of said systems having a stable voltage, comprising a constant alternating voltage source, a source of alternating potential proportional to the magnitude and phase of current flowing between said power systems, a voltage sensitive device, and means connected to both of said power systems for controlling the flow of current between said power systems, said voltage sensitive means being connected to selectively operate said controlling means, said constant voltage source and source of proportional potential being connected to said voltage sensitive means so that increases in the same component of current as that component of power to be controlled results in said voltage sensitive means actuating said controlling means to decrease said component of current.

2. A system for controlling the flow of one component (i.e. reactive or inphase) of power between a pair of interconnected electrical power systems, neither of said systems having a stable voltage, comprising a constant alternating voltage source, a source of alternating potential proportional to the current flowing between said power systems, a voltage sensitive device, and voltage regulating transformer means for controlling the flow of current between said power systems, said voltage regulating transformer means having its input circuit connected to one of said power systems and its output circuit connected to the other of said power systems, said voltage sensitive means being connected to selectively control said voltage regulating transformer means, said constant voltage source and source of proportional potential being connected to said voltage sensitive means so that increases in the same component of current as that component of power to be controlled results in said voltage sensitive means actuating said voltage regulating transformer means to decrease said component of current.

3. A system for controlling the flow of reactive power between a pair of interconnected electrical power systems, neither of said systems having a stable voltage, comprising voltage regulating means having output circuit means connected to a first electrical power system and input circuit means connected to a second electrical power system, voltage regulating relay means having a coil and contacts, a reversible motor drive for controlling said voltage regulating means, said contacts being connected to selectively operate said motor drive, a source of constant alternating potential, reactance means, means providing a voltage across said reactance means proportional to the flow of zero power factor current between said power systems, the coil of said relay being connected in series with said reactance means and said source of constant alternating potential.

4. A system for controlling the flow of reactive power between a pair of interconnected electrical power systems neither of the power systems having a stable voltage comprising voltage regulating means having output circuit means connected to a first electrical power system and input circuit means connected to a second electrical power system, voltage regulating relay means having a coil and contacts, a reversible motor drive mechanically coupled to said voltage regulating means for controlling said voltage regulating means, variable reactance means, variable resistance means, means providing a voltage across said reactance and resistance means proportional to the flow of current between said power systems, a source of constant alternating potential inphase with the voltage of one of said power systems, said coil being connected in series with said source, reactance means, and resistance means, said reactance means and resistance means being connected such that said contacts actuate said motor drive to decrease the flow of zero power factor current.

5. A system for controlling the flow of reactive power between a pair of interconnected electrical power systems comprising first and second unregulated power systems, voltage regulating means having output circuit means connected to said first system and input circuit means connected to said second system, voltage regulating relay means having a coil and contacts, reversible motor means mechanically coupled to said voltage regulating means for controlling said voltage regulating means, line drop compensator means comprised of a variable reactance means and variable resistance means, current transformer means connected to said compensator means for providing a voltage thereacross proportional to the flow of current between said first and second power systems, and a source of constant alternating potential inphase with the voltage of said power systems, said coil being connected in series with said source and said compensator means, said reactance means being connected such that said contacts actuate said motor drive to decrease the flow of zero power factor current.

6. A system for controlling the flow of reactive power between a pair of interconnected electrical power systems comprising first and second unregulated electrical power systems, tap changing transformer means having a first winding connected to said first power system and a second tapped winding connected to said second power system, a voltage regulating relay having coil and contacts, a reversible motor drive mechanically coupled to said tap changing transformer to change the taps on said second winding, said contacts being connected to selectively operate said motor drive, line drop compensator means comprised of a variable reactor and a variable resistor, current transformer means inductively coupled to a conductor between said tap changing transformer means and one of said power systems for providing a voltage across said compensator means proportional to the flow of current between said power system, and a source of constant alternating potential inphase with the voltage of said power systems, said coil being connected in series with said source and said compensator means, said reactor and resistor being connected such that said contacts actuate said motor drive to vary the turns ratio between said first winding and said second winding to decrease the flow of zero power factor current.

7. A system for controlling the flow of reactive power between a pair of interconnected electrical power systems comprising first and second unregulated power systems, voltage regulating means having output circuit means connected to said first system and input circuit means connected to said second system, voltage regulating relay means having a coil and contacts, reversible motor means mechanically coupled to said voltage regulating means for controlling said voltage regulating means, line drop compensator means comprised of a variable reactance means and variable resistance means, current transformer means connected to said compensator means for providing a voltage thereacross proportional to the flow of current between said first and second power systems, and a source of constant alternating potential, the output voltage of said source being 90° out of phase with the secondary winding of said current transformer for unity power factor load current, said coil being connected in series with said source and said compensator means, said resistance means being connected such that said contacts actuate said motor drive to decrease the flow of zero power factor current.

8. A system for controlling the flow of inphase power between a pair of interconnected electrical power systems comprising first and second electrical power systems, neither of said systems having a stable voltage, phase angle control means having output circuit means connected to said first system and input circuit means connected to said second system, voltage regulating relay means having a coil and contacts, reversible motor means mechanically coupled to said phase angle control means for controlling said control means, line drop compensator means comprised of a variable reactance means and variable resistance means, current transformer means connected to said compensator means for providing a voltage thereacross proportional to the flow of current between said first and second systems, a source of constant alternating potential, said coil being connected in series with said source and said compensator means, the output voltage of said source being 90° out of phase with the secondary winding voltage of said current transformer for unity power factor load current, said reactance means being connected such that said contacts actuate said motor drive to decrease the flow of unity power factor current.

References Cited in the file of this patent

UNITED STATES PATENTS

| | | |
|---|---|---|
| 2,079,488 | Champlin | May 4, 1937 |
| 2,525,489 | Jolly | Oct. 10, 1950 |
| 2,707,241 | Griscom | Apr. 26, 1955 |